United States Patent Office 3,539,648
Patented Nov. 10, 1970

3,539,648
CATALYST POLYMERIZATION REACTION
Bernard A. Orkin, Cherry Hill, N.J., assignor to Mobil Oil Corporation, a corporation of New York
No Drawing. Filed June 22, 1967, Ser. No. 647,948
Int. Cl. C07c 43/00, 43/10
U.S. Cl. 260—615    13 Claims

ABSTRACT OF THE DISCLOSURE

Polymerization of epoxy hydrocarbons is carried out in batch or continuous operations in the presence of basic silica gel or basic crystalline aluminosilicate as heterogeneous catalyst. The polymerization may be improved by adding polyhydroxy or polyamino initiators to the reaction mixture. The products are used to produce polyurethanes by reacting them with isocyanates, or ester lubricants by reacting them with carboxylic acids.

BACKGROUND OF THE INVENTION

This invention relates to a process for producing improved polymers of olefin oxides, and in particular it relates to improved processes for producing polymeric epoxide compounds using basic silicon-containing catalysts and to the compositions produced thereby.

DESCRIPTION OF THE PRIOR ART

In U.S. 3,236,785, there is disclosed a process for producing solid polymers of a vicinal monoepoxide using Group III pyrophosphoric acid salts as the catalyst. Solid polymers are also produced in a process claimed in U.S. 3,214,387, using as a catalyst, an alkaline earth metal hexammoniate in the presence of a hydroxy-containing organic compound. The claimed polymerization reaction is performed in the presence of liquid ammonia. In U.S. 3,141,854, a process similar to the previously discussed process is claimed wherein there is also present a dialkyl sulfoxide. The processes of these patents utilize a variety of different catalysts. Each catalyst system is separate and distinct from the others. The discovery of new and useful catalyst systems is therefore very desirable. Moreover, preferred polyols for subsequent reaction with organic isocyanates in the preparation of polyurethanes are in the liquid state or able to be reacted in a liquid state; the aforenoted patents describe only solid products.

SUMMARY OF THE INVENTION

It has now been discovered that polyether polyols may be obtained in improved yields from the polymerization of an epoxy hydrocarbon, also termed olefin oxide, containing 2 to 20 carbon atoms, by contacting the olefin oxide in the presence of a basic alkali metal or alkaline earth metal silica gel or crystalline aluminosilicate.

The preferred reaction contemplated in this invention deals with the polymerization of olefin oxides free of ethylenic unsaturation in a polar solvent. Most readily available olefin oxides are those containing an oxirane oxygen, i.e., bonded to adjacent or vicinal carbon atoms, such as

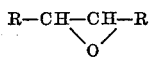

wherein each of the R groups may be hydrogen or alkyl, cycloalkyl, aralkyl, aryl or alkaryl, containing from 1 to about 18 carbon atoms. R may thus include methyl, ethyl, propyl, butyl, isobutyl, nonyl, dodecyl, phenyl, tolyl and the like. The preferred olefin oxide compounds contain no more than 6 carbon atoms. Ethylene oxide, propylene oxide and butylene oxide are the most preferred olefin oxides.

The catalyst used in this invention are basic silicon-containing solids. One of these is a basic silica gel prepared by reacting an alkali metal silicate solution with a glycerol ester and causing the reaction mixture to gel. Upon drying, the gel should contain from about 10% to about 20% of the alkali metal. The other form of basic silicon-containing catalyst is the basic crystalline aluminosilicate, particularly the alkali metal forms of the zeolites. The X and Y zeolites described in U.S. 2,882,244 and 3,130,007 respectively, may be employed. These metals are essentially dehydrated forms of crystalline siliceous zeolites containing varying quantities of alkali metal and aluminum. The alkali metal atoms, silicon and aluminum are arranged in a definite crystalline pattern, the final structure containing small cavities interconnected by channeling throughout the zeolite. The mineral faujasite is typical of the type of zeolites which may be used in this invention. Preferred alkali metal zeolites and alkaline earth metal exchanged zeolites are the sodium, potassium, strontium, and calcium zeolites. The preparation, refining and manner of using the alkali metal crystalline aluminosilicates are well-known in the art. U.S. 3,271,418 and other patents described the preparation of these zeolite catalysts.

The polymerization of the olefin oxides may take place in the presence of the catalyst alone in which the olefin oxide serves as the solvent or in which an inert polar solvent is added to the reaction mixture. The reaction mixture is thus maintained in a liquid state. Suitable polar solvents include

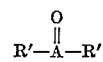

wherein A is carbon or sulfur and the R' groups are each an alkyl group containing from 1 to about 5 carbon atoms, and they may be the same or different. The preferred solvents are dimethyl sulfoxide, diethyl sulfoxide, acetone, methylethyl ketone and the like. A second group of solvents is the alkyl nitrile, R''—CN, wherein R'' is alkyl having 1 to 10 carbon atoms, such as acetonitrile. In general, therefore, polar solvents provide useful carrying medium for the reaction, though the specifically named classes are preferred. The amount of solvent may range from about 0.5:1 to 5:1 by weight of the olefin oxide.

The polymerization of the olefin oxide may be initiated by the presence of a polyhydroxy or polyamino compound. Preferably the polyhydroxy or polyamino compounds contemplated in this invention are those containing at least 2 hydroxy or amino groups, and preferably from 3 to 6 hydroxy or amino groups. Such polyols include ethylene glycol, propylene glycol, trimethylolpropane, pentaerythritol, sucrose, glucose, methyl-d-glucoside and the cyclic polyols, such as cyclohexanediol, d-quercitol, cyanuric acid, and the like. The polyamino compounds that may be used in this invention include the alkylene polyamines, such as methylenediamine, ethylenediamine, diethylenetriamine, and the like. Cyclic amines, such as melamine, although insoluble in the reaction mixture, may still be used and may lead to complete conversion of the olefin oxide.

Polyether polyols produced in this invention contain at least 2 reacted olefin oxide units, and preferably 4 to 20. The molecular weight may range from about 200 to about 2000. The polymerization reaction may be conducted in a temperature in the range from about 200° F. to about 600° F. or higher if desired. The preferred range of temperatures is from 250° F. to about 450° F. The optimum reaction temperature depends, of course, on the particular catalyst or initiator employed, the concentration of the various components of the reaction mixture and the like. Reaction times may vary from several minutes to several hours.

The catalysts may be used effectively in a continuous process as well as a batch process. Hence, the broadest aspect of this invention applies to both types of processes. Yields of polymer based on percent of olefin oxide convert can reach 100%. The reaction products, viscous liquids, can thereafter be reacted with organic isocyanates such as tolylene diisocyanate and phenylene diisocyanate, to produce polyurethanes, which are commercially useful in producing adhesives, structural foams, coatings and the like. Esterification with carboxylate acids can produce synthetic ester lubricants. Monocarboxylic acids or mixtures of acids having from 5 to 15 carbons may be employed for this purpose.

The following examples illustrate the various aspects of this invention without limiting the scope thereof. Parts and percentages used in the examples are deemed to be on a weight basis unless otherwise specified.

Example 1

(A) Catalyst A: A silica gel was prepared in a suitable reactor by adding 240 cc. of triacetin to 3280 cc. of a sodium silicate solution containing about 60% by weight of water, 5% by weight of sodium hydroxide and 35% by weight of sodium silicate. The liquid gelled in about 45 minutes. The gel was dried at 225° to 250° F. It contained 15% sodium.

(B) Catalyst B: A crystalline sodium aluminosilicate having an effective pore diameter in the range of 5 to 16 A. was prepared in a suitable reactor by adding to the sodium silicate solution of (A) a sodium aluminate solution containing about 85% by weight of water, about 11% by weight of sodium aluminate with about 5% sodium hydroxide. The mixture was heated and the solids were thereafter filtered off, washed and dried.

(C) Catalyst C: The crystalline sodium aluminosilicate of (B) was reacted with strontium halide or nitrate to produce the corresponding strontium derivative.

Example 2

Catalyst A was used in the polymerization of propylene oxide, in which the oxide was the solvent. To 120 grams of propylene oxide were added 10 grams of catalyst A. The reaction was carried out in a 500 ml. rocking autoclave, at 400° F. for 6 hours. At the end of the reaction period excess propylene oxide was removed by distillation. The remaining viscous liquid, 33 grams, was equivalent to a conversion of 28%.

Analysis:
  Hydroxyl number _____ 313
  Molecular weight _____ 347

Example 3

To 116 grams of propylene oxide were added 10 grams of catalyst A in the presence of 26.8 grams of trimethylolpropane. The same equipment and reaction conditions of Example 2 were used. At the end of the 6 hour period, little excess propylene oxide remained. The residual viscous liquid, amounting to 141 grams, indicated substantially complete polymerization of the propylene oxide.

Analysis:
  Hydroxyl number _____ 254
  Molecular weight _____ 596

Example 4

To 58 grams of propylene oxide were added 5 grams of catalyst A in the presence of 78 grams of dimethyl sulfoxide as a solvent. The reaction was conducted in a rocking bomb at 400° F. At the end of 6 hours, only a trace amount of propylene oxide remained. The remaining viscous liquid (50 grams) was equivalent to about 100% conversion of the propylene oxide.

Analysis:
  Hydroxyl number _____ 154
  Molecular weight _____ 563

Example 5

(A) To 58 grams of propylene oxide were added 11.8 grams of a catalyst A in a 300 ml. stirring autoclave in the presence of 78 grams of dimethylsulfoxide. Also present were 30.8 grams of sucrose. The reaction was conducted at 345° F. for 6 hours. The yield of viscous liquid (96 grams) indicated complete conversion of the propylene oxide to polymer.

Analysis:
  Hydroxyl number _____ 455
  Molecular weight _____ 374

(B) A similar reaction was conducted at 350° F. using 17.6 grams of catalyst A, 87 grams of propylene oxide, 461.1 grams of sucrose. The yield of polymer (120 grams) was approximately 85% of the reaction mixture.

Analysis:
  Hydroxyl number _____ 470
  Molecular weight _____ 545

Example 6

Into the rocking bomb used in Example 4 were added 145 propylene oxide, 12.5 grams of catalyst A, 195 grams of dimethyl sulfoxide and 6.7 grams of trimethylolpropane. The reaction mixture was heated at 200° F. for 6 hours. After removal of the solvent and unreacted polyol and propylene oxide, the yield of residual viscous liquid was 150 grams, equivalent to approximately 100% conversion.

Analysis:
  Hydroxyl number _____ 151
  Molecular weight _____ 1265

Example 7

Into the rocking autoclave similar to that used in Example 2 were added 10 grams of the sodium X-zeolite (catalyst B), 116 grams of propylene oxide and 26.3 grams of trimethylolpropane. The polymerization reaction was conducted at 400° F. for 6 hours. Excess propylene oxide was removed by distillation. The resulting viscous liquid represented a 40% conversion of the reactants to the polymer.

Analysis:
  Hydroxyl number _____ 301
  Molecular weight _____ 296

Example 8

Using the same equipment as in Example 7, one gram of the strontium X-zeolite (catalyst C) and 116 grams of propylene oxide were heated at 400° F. for 6 hours. At the end of this time, the excess propylene oxide was removed. The viscous liquid remaining, 17 grams, represented a conversion of 14% to the polymer.

Analysis:
  Hydroxyl number _____ 203
  Molecular weight _____ 280

In the following examples, propylene oxide was polymerized in a number of different continuous operations. The catalyst is contained in a 100 cc. reaction vessel. The various charge stocks containing propylene oxide, with or without solvent and polyol, are passed through and out of the reaction vessel at 400° F. in each operation. The conditions and results of the operations are tabulated below:

|  | Examples | | |
|---|---|---|---|
|  | 9 | 10 | 11 |
|  | Catalysts | | |
|  | A | A | B |
| Weight, grams | 36 | 33 | 59 |
| Charge stock: | | | |
| Solvent |  | DMSO |  |
| Concentration |  | DMSO |  |
| Polyol | TMP | TMP |  |
| Concentration, percent of oxide | 19 | 19 |  |
| Rate, LHSV | 0.2 | 0.2 | 0.2 |
| Grams/hour | 17 | 17 | 18 |
| Total liquid product, grams [1] | 17 | 44 | 47 |
| Product after topping, grams | 7.1 | 10.4 | 6.9 |
| Oxide reacted, percent by wt | 28 | [2] 52 | 38 |
| Analyses: | | | |
| Hydroxyl number | 608 | 540 |  |
| Molecular weight | 417 | 303 |  |

[1] Based on one-hour sample.
[2] Conversion for last 1.8 hours of run.

NOTE:
DMSO=Dimethyl sulfoxide, 1:1 mole ratio with propylene oxide; TMP=Trimethylolpropane.

Example 12

Into a 500 ml. rocking autoclave were added 174 grams of propylene oxide, 97 grams of methyl-d-glucoside, 234 grams of dimethyl sulfoxide and 20 grams of catalyst A. The mixture was heated at 300° F. for 6 hours. The autoclave was then cooled and the reaction product removed. The catalyst was removed by filtration, and the solvent, dimethylsulfoxide, was distilled off. The residue of 274 grams was a viscous oil.

Analysis:
  Hydroxyl number _____ 427
  Molecular weight _____ 605

Example 13

Into a 300 ml. stirring autoclave were added 87 grams of propylene oxide, 21.5 grams of cyanuric acid and 6.7 grams of catalyst A. The reaction mixture was heated at 400° F. for 13 hours. The conversion after separation of the liquid product was only 66% of the propylene oxide. The molecular weight of the polymer was 193.

Example 14

Into a suitable reactor were added 13.6 grams of pentaerythritol, 77 grams of propylene oxide and 6.7 grams of catalyst A. The reaction mixture was heated at 400° F. for 6 hours. The resulting product was 85 grams of a viscous liquid. No residual propylene oxide was detected. The molecular weight of the product was 545.

Example 15

Into the stirring autoclave used in Example 5 were added 21 grams of melamine, 58 grams of propylene oxide, 78 grams of dimethyl sulfoxide and 6.7 grams of catalyst A. The reaction mixture was heated at 400° F. for 6 hours. The propylene oxide was found to be completely converted to the viscous polymer which had a molecular weight of 296.

Example 16

In a suitable reactor, 11 grams of the product of Example 3 was reacted with 11 grams of pelargonic acid in the presence of 0.5 gram of para-toluene sulfonic acid and 50 cc. of benzene. The mixture was heated to reflux and held for 2½ hours at reflux to remove water. The reaction product was washed with two portions of 10% sodium hydroxide solution, followed by a water wash. When the washings were neutral, the solvent and unreacted pelargonic acid were removed by distillation under vacuum.

The resulting product, of 14.6 grams, was a liquid at −40° F., and had a viscosity index of 135. The Example 3 product is a solid at 40° F.

A similar product was made, except that ethylene oxide was polymerized using the Example 3 procedure. The ester prepared from this product and pelargonic acid had the following properties:

Kinematic viscosity, cs. at:
  −40° F. _____ 22,000
  100° F. _____ 32.07
  210° F. _____ 6.22
Viscosity index _____ 146

Example 17

A polypropylene oxide product was produced according to the procedure of Example 5(B) from 383 grams of propylene oxide, 144 grams of sucrose, and 70.4 grams of catalyst A. The product, 556 grams, had the following properties:

Analysis:
  Hydroxyl number _____ 500
  Molecular weight _____ 508

This product was reacted with "PAPI," a commercial polyphenylene-polymethylene polyisocyanate, primarily a triisocyanate, having 129 to 132 isocyanate equivalents. A reaction mixture of 250 parts of "PAPI," 154 parts of the above polymer, and 120 parts of Vircol 82 (a product of Mobil Chemical Corp.), a phosphorus-containing polyol having a hydroxyl number of 212. Other typical additives for preparing useful polyurethane foams amounting to about 90 parts were included. The reaction conditions were the same as for standard polyurethane foam preparation.

The following conditions were reached in the preparation of this product:

Foaming rate:
  Cream time—18 seconds
  Gel time—51 seconds
  Rise time—91 seconds
  Tack time—91 seconds
Foam density—1.97 lb./cu. ft.

This invention has been described with the aid of specific examples and other illustrative embodiments. It is understood that variations may be made within the scope of these embodiments by those skilled in the art without departing from the spirit of the invention.

I claim:
1. A process for polymerizing an olefin oxide which comprises effecting, in the presence of an alkane polyol initiator, the polymerization of an olefin oxide of the formula

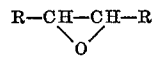

wherein the R groups are each selected from the group consisting of hydrogen and alkyl having from 1 to about 18 carbon atoms, at a temperature within the range of from about 200° F. to about 600° F., in the presence of a catalyst, said catalyst being a dried basic silica gel prepared by reacting an alkali metal silicate or an alkaline earth metal silicate with triacetin in the presence of a hydroxide of an alkali metal or alkaline earth metal, the basic silica gel containing from about 10% to about 20% of said metal.

2. The process of claim 1 wherein the polymerization reaction is conducted at a temperature of from the 250° to 450° F.

3. The process of claim 1 wherein the olefin oxide is propylene oxide.

4. The process of claim 1 wherein present in the reaction mixture is a solvent selected from the group consisting of dialkyl sulfoxides and alkyl ketones of the structure $$R'-\overset{\overset{O}{\|}}{A}-R'$$

wherein A is selected from the group consisting of carbon and sulfur, and R' contains from 1 to 5 carbon atoms per alkyl group, and alkyl nitriles of the structures R''—CN, wherein R'' is an alkyl group having 1 to 10 carbon atoms.

5. The process of claim 4 wherein the solvent is dimethyl sulfoxide.

6. The process of claim 1 wherein said initiator is selected from the group consisting of ethylene glycol, propylene glycol, trimethylol propane and pentaerythritol.

7. The process of claim 6 wherein the polyhydroxy compound is trimethylolpropane.

8. The process of claim 6 wherein the polyhydroxy compound is pentaerythritol.

9. A process for polymerizing an olefin oxide which comprises effecting, in the absence of an initiator, the polymerization of an olefin oxide of the formula $$R-CH-CH-R \atop \diagdown O \diagup$$

wherein the G groups are each selected from the group consisting of hydrogen and alkyl having from 1 to about 18 carbon atoms, at a temperature within the range of from about 200° F. to about 600° F., in the presence of a catalyst, said catalyst being a dried basic silica gel prepared by reacting an alkali metal silicate or an alkaline earth metal silicate with triacetin in the presence of a hydroxide of an alkali metal or alkaline earth metal, the basic silica gel containing from about 10% to about 20% of said metal.

10. The process of claim 9 wherein the polymerization is conducted at a temperature of from 250° to 450° F.

11. The process of claim 9 wherein the olefin oxide is propylene oxide.

12. The process of claim 9 wherein present in the reaction mixture is a solvent selected from the group consisting of dialkyl sulfoxides and alkyl ketones of the structure $$R'-\overset{\overset{O}{\|}}{A}-R'$$

wherein A is selected from the group consisting of carbon and sulfur, and R' contains from 1 to 5 carbon atoms per alkyl group, and alkyl nitriles of the structure R''—CN, wherein R'' is an alkyl group having 1 to 10 carbon atoms.

13. The process of claim 12 wherein the solvent is dimethyl sulfoxide.

References Cited

UNITED STATES PATENTS

| 2,327,053 | 8/1943 | Marple et al. |
| 2,527,970 | 10/1950 | Sokul. |
| 2,807,651 | 9/1957 | Britton et al. |
| 3,042,666 | 7/1962 | Gentles. |
| 3,075,928 | 1/1963 | Lanham. |
| 3,321,412 | 5/1967 | Naro. |
| 3,328,467 | 6/1967 | Hamilton. |
| 3,341,456 | 9/1967 | Sawyer. |
| 3,370,056 | 2/1968 | Yotsuzuka et al. |
| 3,393,243 | 7/1968 | Cuscurida. |

FOREIGN PATENTS

| 389,147 | 6/1963 | Japan. |

OTHER REFERENCES

Wyandotte: Technical Data on Pluracol TP Triols (1962), 1 page.

Wyandotte: Technical Data on Pluracol TP340 Triol (1962), 1 page.

HOWARD T. MARS, Primary Examiner

U.S. Cl. X.R.

23—182; 252—451, 455; 260—2, 2.5, 77.5, 209, 210, 410.6, 496, 563, 571, 584, 611

UNITED STATES PATENT OFFICE
CERTIFICATE OF CORRECTION

Patent No. 3,539,648            Dated November 10, 1970

Inventor(s)   Bernard A. Orkin

It is certified that error appears in the above-identified patent and that said Letters Patent are hereby corrected as shown below:

Column 2, line 69, "yolyols" should read -- polyols

Column 4, line 24, "461.1" should read -- 46.1 --.

Signed and sealed this 9th day of March 1971.

(SEAL)
Attest:

EDWARD M. FLETCHER, JR.
Attesting Officer

WILLIAM E. SCHUYLER,
Commissioner of Paten